No. 828,952. PATENTED AUG. 21, 1906.
J. MORIG.
STEERING DEVICE FOR VEHICLES.
APPLICATION FILED JUNE 12, 1905.
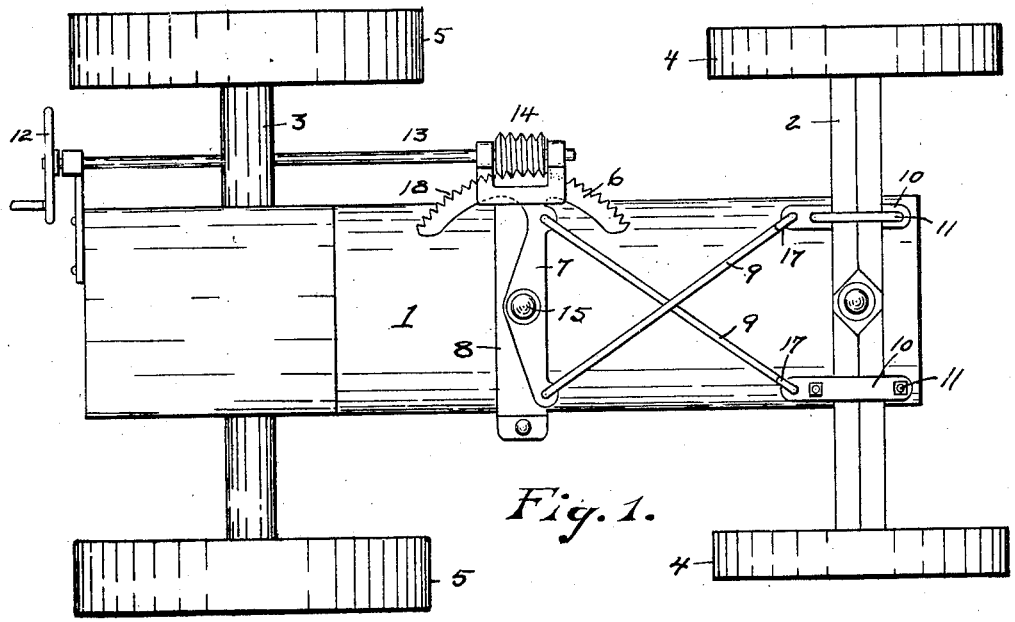
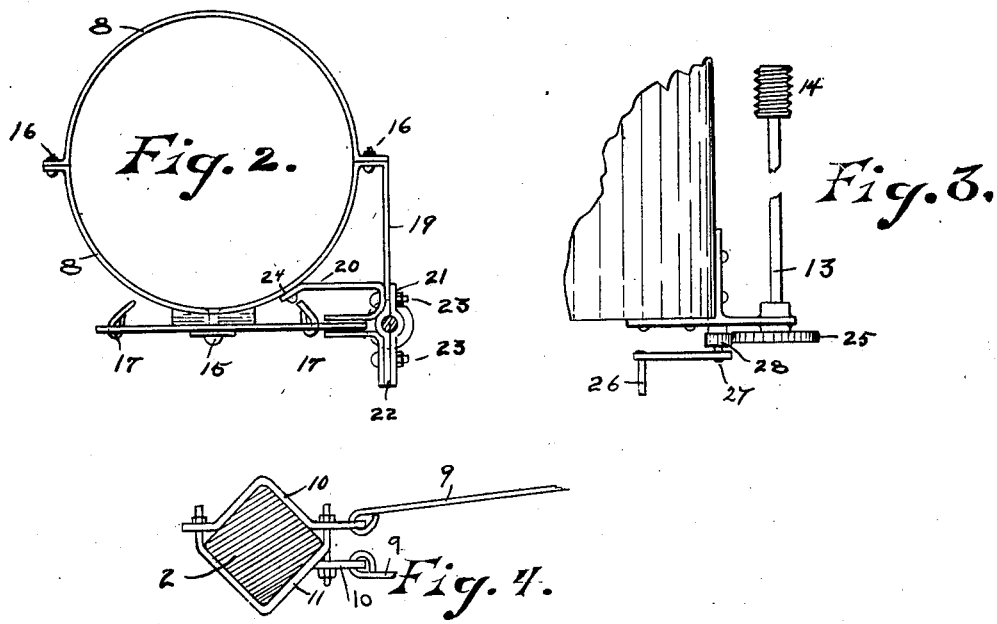
WITNESSES:
R. Steinhart
Nellie Taugher
INVENTOR
John Morig
BY
Erwin & Wheeler
ATTORNEYS.
THE NORRIS PETERS CO., WASHINGTON, D. C.

UNITED STATES PATENT OFFICE.

JOHN MORIG, OF BLACK EARTH, WISCONSIN.

STEERING DEVICE FOR VEHICLES.

No. 828,952.

Specification of Letters Patent.

Patented Aug. 21, 1906.

Application filed June 12, 1905. Serial No. 264,791.

*To all whom it may concern:*

Be it known that I, JOHN MORIG, a citizen of the United States, residing at Black Earth, county of Dane, and State of Wisconsin, have invented new and useful Improvements in Steering Devices for Vehicles, of which the following is a specification.

The object of my invention is to provide a strong, efficient, and durable guiding mechanism of simple construction which can be used not only for inclining the axle of a traction-engine toward the right and left when guiding the vehicle, but which will also hold the axle at any desired point of adjustment, either parallel with the other axle or at any desired angle thereto, without the continuous effort of the operator.

The construction of my invention is explained by reference to the accompanying drawings, in which—

Figure 1 represents a bottom view thereof connected with the boiler of a traction-engine. Fig. 2 represents a front view of the metallic frame by which the guiding mechanism is connected with the exterior shell or periphery of a boiler. Fig. 3 is a detail showing a modified form of device for communicating motion to the operating-shaft by which the power applied to the crank or hand wheel is multiplied, and Fig. 4 is a detail of a device for connecting the operating mechanism with one of the axles.

Like parts are identified by the same reference-figures throughout the several views.

The boiler 1, supporting-axles 2 and 3, and axle-supporting wheels 4 4 and 5 5 are all of the ordinary construction.

My guiding mechanism consists, among other things, in the peculiar construction and arrangement of the semicircular gear-plate 6, which is rigidly connected with or formed integrally with the two-armed lever 7; means for pivotally connecting said lever 7 at its center to the periphery of the boiler 1 by annular clamping-bands 8 8; means for connecting the respective ends of the two-armed lever 7 with the front axle 2 by the crossed links 9 9 and the two sets of clips or clamping-bands 10 and 11, and the means for communicating motion from the hand-wheel 12 to the gear-plate 6, consisting in the longitudinal shaft 13 and worm-gear 14. The two-armed lever 7 is pivotally connected with the lower side of the clamping-bands 8 by the pivotal bolt 15, and the clamping-band 8 is formed in two circular parts, which parts are connected together around the boiler by the clamping-bolts 16 16 in the ordinary manner. The respective ends of the crossed links 9 are bent over, forming loops 17 17, and the loops at one end of said links are inserted through apertures provided therefor in said two-armed lever 7 at uniform distances from said lever-supporting pivot 15, and the loops at the opposite end of said links are inserted through apertures provided therefor in the clamping-bands 10, whereby as the two-armed lever 7 is inclined, as hereinafter described, at an angle to the clamping-bands 8 said axle 2 will be inclined in the opposite direction. Motion is communicated to said two-armed lever 7 from the hand-wheel 12 through the shaft 13 and worm-gear 14, the worm upon the gear 14 being adapted to mesh or engage in the teeth 18 of said semicircular plate, whereby as the hand-wheel is revolved in one direction the vehicle will be guided toward the right and when revolved in the opposite direction the vehicle will be guided toward the left. The worm-gear 14 and the lower end of the shaft 13 are supported from the boiler through the clamping-bands 8, hanger 19, bracket 20, journal-bearings 21 and 22, and bolts 23 and 23. To prevent the contact of the crossed links 9 9 as one of the wheels on the axle 2 is thrown upwardly or downwardly by passing over an elevation or dropping into a depression, the front ends of said links are connected one above and the other below the horizontal center of said axle, as indicated in Fig. 4, whereby the front ends of said levers are separated a sufficient distance to prevent the liability of contact. To provide for multiplying the power applied by the hand of the operator to the guiding mechanism as may be found necessary in guiding heavy vehicles over soft or uneven surfaces, I preferably substitute a gear-wheel 25 for the hand-wheel 12 upon the driving-shaft 13 and communicate motion from the operating-crank 26 to said gear-wheel 25 through the shaft 27 and pinion 28, which pinion 28 is rigidly affixed to the shaft 27 and revolved with the same as the crank 26 is turned, when owing to the fact that the pinion 28 is of less diameter than the gear-wheel 25 the power applied to said crank through said pinion and gear-wheel will, as stated, be proportionately increased. It will be obvious that by thus crossing the links 9 9, by which the two-armed lever 7 is connected with the guiding-axle 2, said links 9 are brought out of the line of movement of the axle-supporting wheels 4, whereby the liability of said wheels being brought in contact with said links as the vehicle is turned is avoided.

Having thus described my invention, what I claim as new, and desire to secure by Letters Patent, is—

1. The combination in a steering device for vehicles, of a two-armed lever arranged at right angles to and pivotally connected with the frame of the vehicle at its longitudinal center, a gear-segment connected at its center with one end of said two-armed lever, a worm-gear meshing with the teeth of said gear-segment, an operating-shaft connected with said worm-gear, means for rotating said shaft by the manual act of the operator, and means for communicating motion from the respective ends of said two-armed lever to the guiding-axle of the vehicle, all substantially as and for the purpose specified.

2. In a steering device for vehicles, the combination of a two-armed lever pivotally connected with a supporting-frame beneath the longitudinal center of the vehicle; a circular gear-plate connected with one end of said two-armed lever; a worm-gear meshing with the teeth of said circular plate; a shaft connected with said worm-gear; means for rotating said shaft by the manual act of the operator; two sets of clamping-bands connected with the front axle upon the respective sides of its center, one set of said clamping-bands being provided with an aperture above the longitudinal center of its supporting-axle and the other provided with an aperture located below the longitudinal center of said axle and a pair of crossed links, one end of said links being connected with the respective ends of said two-armed lever and the opposite ends of said links being connected with the apertures of said clamping-bands, substantially as set forth.

In testimony whereof I affix my signature in the presence of two witnesses.

JOHN MORIG.

Witnesses:
 ORVILLE W. DONKLE,
 PETER OLM.